United States Patent
Freyer et al.

(10) Patent No.: US 8,107,125 B2
(45) Date of Patent: Jan. 31, 2012

(54) METHOD OF GENERATING PRINTING COLOR PROFILES FOR COLOR MANAGED REPRODUCTION OF COLOR PRINTS WITH TRANSPARENT LAYER

(75) Inventors: Norbert Freyer, Altenholz (DE); Eggert J. Jung, Schoenberg (DE)

(73) Assignee: Eastman Kodak Company, Rochester, NY (US)

( * ) Notice: Subject to any disclaimer, the term of this patent is extended or adjusted under 35 U.S.C. 154(b) by 804 days.

(21) Appl. No.: 12/293,431

(22) PCT Filed: Mar. 23, 2007

(86) PCT No.: PCT/EP2007/002573
§ 371 (c)(1),
(2), (4) Date: Sep. 18, 2008

(87) PCT Pub. No.: WO2007/107374
PCT Pub. Date: Sep. 27, 2007

(65) Prior Publication Data
US 2009/0219554 A1    Sep. 3, 2009

(30) Foreign Application Priority Data
Mar. 23, 2006   (DE) .......................... 10 2006 013 875

(51) Int. Cl.
*H04N 1/04*   (2006.01)

(52) U.S. Cl. .......... 358/1.9; 358/504; 358/518; 358/521
(58) Field of Classification Search .................. 358/1.9, 358/504, 518, 521
See application file for complete search history.

(56) References Cited

U.S. PATENT DOCUMENTS

| | | | |
|---|---|---|---|
| 2005/0129307 A1 | 6/2005 | Hasigawa | |
| 2005/0243341 A1 | 11/2005 | Ng | |
| 2007/0127940 A1* | 6/2007 | Zaima | 399/53 |
| 2007/0171444 A1* | 7/2007 | Washino | 358/1.9 |

FOREIGN PATENT DOCUMENTS

| | | |
|---|---|---|
| EP | 0660590 | 6/1995 |
| JP | 2002331708 | 11/2002 |

* cited by examiner

*Primary Examiner* — Houshang Safaipour
(74) *Attorney, Agent, or Firm* — William R. Zimmerli; Eugene I. Shkurko

(57) ABSTRACT

The invention relates to a method of generating a printing color profile for printing a printing image with a digital color printing machine, in particular a multi-color printing machine, preferably an electrophotographically operating printing machine. A transparent layer on top of a multi colorant printed image is taken into consideration during the generation of the printing color profile such that a differential clear printing color profile for the clear material effect is determined, said clear printing color profile being added, as needed, to the printing ink color profile of the remaining printing colors for defined substrate classes and specific clear material and coverage levels.

11 Claims, 4 Drawing Sheets

Figure 1:
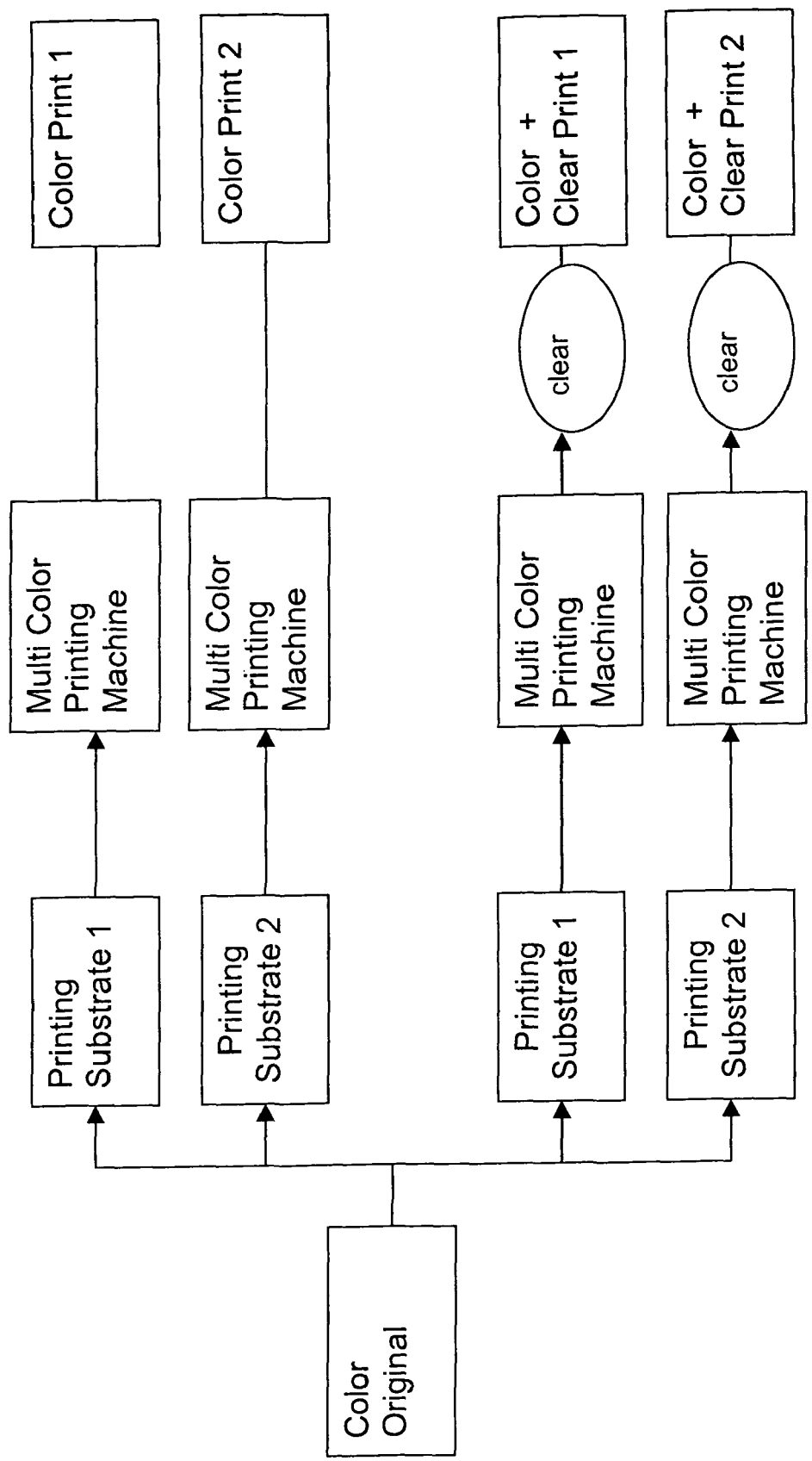

METHOD OF GENERATING PRINTING COLOR PROFILES FOR COLOR MANAGED REPRODUCTION OF COLOR PRINTS WITH TRANSPARENT LAYER

The invention relates to a method of generating and use of a printing color profile for printing a printing image with a digital color printing machine, in particular a multi-color printing machine, preferably an electrophotographically operating printing machine with added transparent layer.

The technical reproduction of color pictures requires a so-called color management.

The background of color managed reproduction including the generation and the purpose of a printing color profile has been explained, for example, in DE 101 10 125 A1 and in the presentation "Optimized ICC-Colormanagement for varying Substrates on a digital CMYK-print system and Spotcolor Simulation for different Color Gamuts" by Eggert Jung and Norbert Limburg published in proceeding of "DPP 2003, International Conference on Digital Production Printing, Barcelona May 18-21, 2003, ISBN:0-89208-246-1, page 70 plus insert.

Various devices are involved in color managed reproduction, for example, image-capturing devices such as scanners or cameras, image-viewing devices such as monitors or control devices, so-called proofers and, for example, production devices such as a printing machine for producing color prints. There are essentially three reasons for color management.

Color spaces available to the devices for the representation of colors vary, so that color space transformations are required in order to-implement the colors. In particular, the color spaces of the devices differ significantly from the color space of a human viewer. In addition, in order to represent the colors, some of the devices work with additive color mixing and some of them work with subtractive color mixing.

Also, during the image processing step, it is frequently not yet defined on what device the images are to be reproduced. Therefore, for example, archiving of images which can later be reproduced on a plurality of devices must be possible.

In addition, nowadays, devices are frequently set up worldwide in totally different locations.

For color space transformation, color values captured with a scanner, for example, could theoretically be directly computed by means of a computer from one device's color space into another device's color space, for example, that of a printing machine; however, in particular in view of the devices involved, which may still need to be defined, and their placement in different countries, an indirect conversion path via a "neutral" intermediate color space is chosen. In most cases, the so-called Lab color space, which has been standardized by the CIE (Commission Internationale d' Éclairage) is used. Consequently, this color space or color system is frequently also referred to as the CIELAB color space. It describes colors in the way in which the normal human observer sees them, and it is independent of the device. The interrelationship or the transition between the respective device color space and the Lab color space is represented by the (specific) color profile of the specific device—in a printing machine by the corresponding printing color profile. The color profiles are generally multi-dimensional conversion tables. These contain, at least for a sub-quantity of the possible Lab values, the allocated device-specific color values, i.e., for a type of grid points of a (mathematically selected) color space grid. Based on this an interpolation is performed for color values in between. The data format of the color profiles has been standardized by the ICC (International Color Consortium). Therefore, these are also referred to as ICC color profiles.

For the color impression of a color print, however, not only the actual color space of the printing machine used is relevant, but also, for example, the printing material used, which, in turn, can cause, for example, a changed color impression—be it only by different "paper-white" colors or by different surface qualities.

Therefore, complex and comprehensive conversion tables are generated as printing color profiles, for their generation many different color test patterns on many different printing materials are measured. The required printing color profile becomes more complex as more flexibility and more features are offered by a printing machine to an operator of a printing machine, for example, in view of the potential use of special inks and the potential use of different printing materials. This applies, above all, to digital printing machines, which are to permit highly flexible and customized printing in relatively small volumes or for small jobs or even with several—for example three—different substrates within one job.

In addition, there is an increasing demand for the production of glossy or matte color prints and/or for making them more durable by providing them with a clear coating. To achieve this, the entire area or part of the area of the printed paper is accentuated, for example, by a separate, clear color separation or image impression of suitable clear material, for example, a clear varnish, toner or the like.

US20050243341 describes a method for color correction of images with a transparent toner on top of a four color print using blending method of parallel processed color profiles with and without transparent toner.

Although, theoretically, such a clear material is not supposed to actually change the color impression of the color print, such a change unfortunately occurs in practical applications. On the one hand, the color impression is changed already simply by the presence of an additional layer and, for example, its glossiness, and, on the other hand, the clear material may also have a slight pigmentation and/or display additional specific light absorption properties. For example, in order to protect images, it is frequently desirable to prevent rapid fading of the printing inks in that a clear protective material is used that is specifically absorbent in the ultraviolet region of the sunlight spectrum. Depending on the clear material that is used, the number of table values of the color profile would thus have to be combinatorially multiplied by the number of selectable clear materials. This not only means a considerable expenditure of time, labor and money, but this also means significantly greater requirements on the computing capacity of any color computer that is used.

Therefore, the object of the invention, referring to a method of the aforementioned type, is to appropriately take into account the additional use of clear material in the printing color profile.

In accordance with the invention, this object is achieved in that a clear material accentuating the colors of the printed image is taken into account during the generation of the printing color profile such that a separate clear printing color profile for the clear material is determined, said clear printing color profile being added or linked, as needed, to the printing ink color profile of the basic printing printing colorants.

Therefore, with the inventive method, clearly less effort is required to generate only the color profile differences which result from the additional use of clear material, optionally also for all color test patterns and printing material pattern combinations, as needed; and these color profile differences are then taken into account, as needed, corresponding to the given situation. In particular, a color conversion table of the clear printing color profile is added or linked to a color conversion table of the printing ink color profile. This is advantageously possible with relatively minimal computer and time efforts.

A relatively simple, however frequently adequate inventive measure for yielding a clear printing profile consists in that the clear printing color profile is determined in that, in a manner known per se, a color profile is generated for a printing image produced from the clear material on a test printing material. Thus, only the printing material samples are provided with the desired clear print, and the other printing inks are left off completely. This means, that only paper-white effects are treated without any other color corrections.

In accordance with the invention, another option provides that the clear printing color profile is determined in that, in a manner known per se, a color profile is generated for a colored printed image produced on a test printing material, that, in a manner known per se, a color profile is generated for the aforementioned colored printed image produced on a corresponding test printing material, however, accentuated by the clear material, and that the clear printing color profile is determined based on the difference between the two aforementioned color profiles. In case of doubt, this is the more accurate method, in which, in order to be more efficient, fewer measurements are preferred, i.e., are not performed for all possible color patterns, and in which additional data determined by interpolation are more relied on.

Preferably, the clear material can be a clear toner. In this case, the multi-color printing machine can comprise an extra printing unit for the clear toner, i.e., in particular, a fifth printing unit for an otherwise standard four-color print with the standard CMYK printing inks.

However, a type of clear varnish can be provided instead, or potentially even additionally, as the clear material. In this case, a separate gloss-producing arrangement (glosser) can be provided for the application of the clear material. In order to fully take this device into account in the generation of the printing ink profile, for example, also in view of aging effects, preferably it is provided that the effect of the separate glosser on a printed image is included in the generation of the clear printing color profile, i.e., measurements are performed after processing in the corresponding device.

As has already been addressed above, the generation of the clear printing color profile is preferably based on a coarser color space grid than the one used for the generation of the printing ink color profile.

In particular, when generating a clear printing color profile by directly printing or coating the respective printing material version with the respective version of the clear material, while omitting the other printing inks, the color change due to the clear material depends largely on the surface quality of the printing material; whereas other parameters of the printing material can frequently be neglected without quality losses, so that only appropriately composed classes of printing materials need to be measured and not each individual printing material version. This is also largely applicable, or logical, regarding a differential determination of the clear printing color profile when color patterns of printing inks—with and without clear material—are measured.

Embodiments which could result in additional inventive features, which, however, do not restrict the scope of the invention, are shown in schematic block diagrams.

They show in

Figure 2:
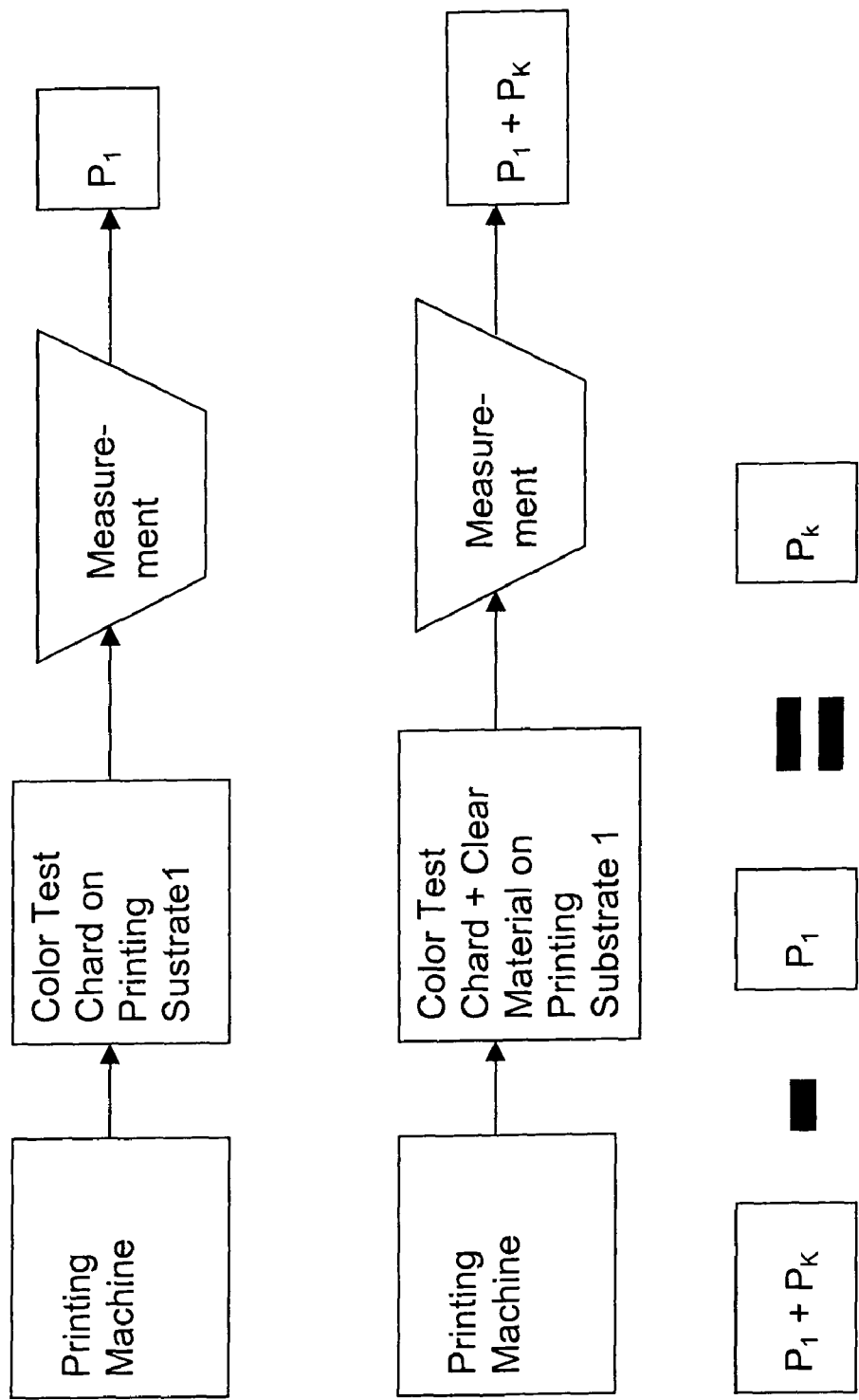
Figure 3:
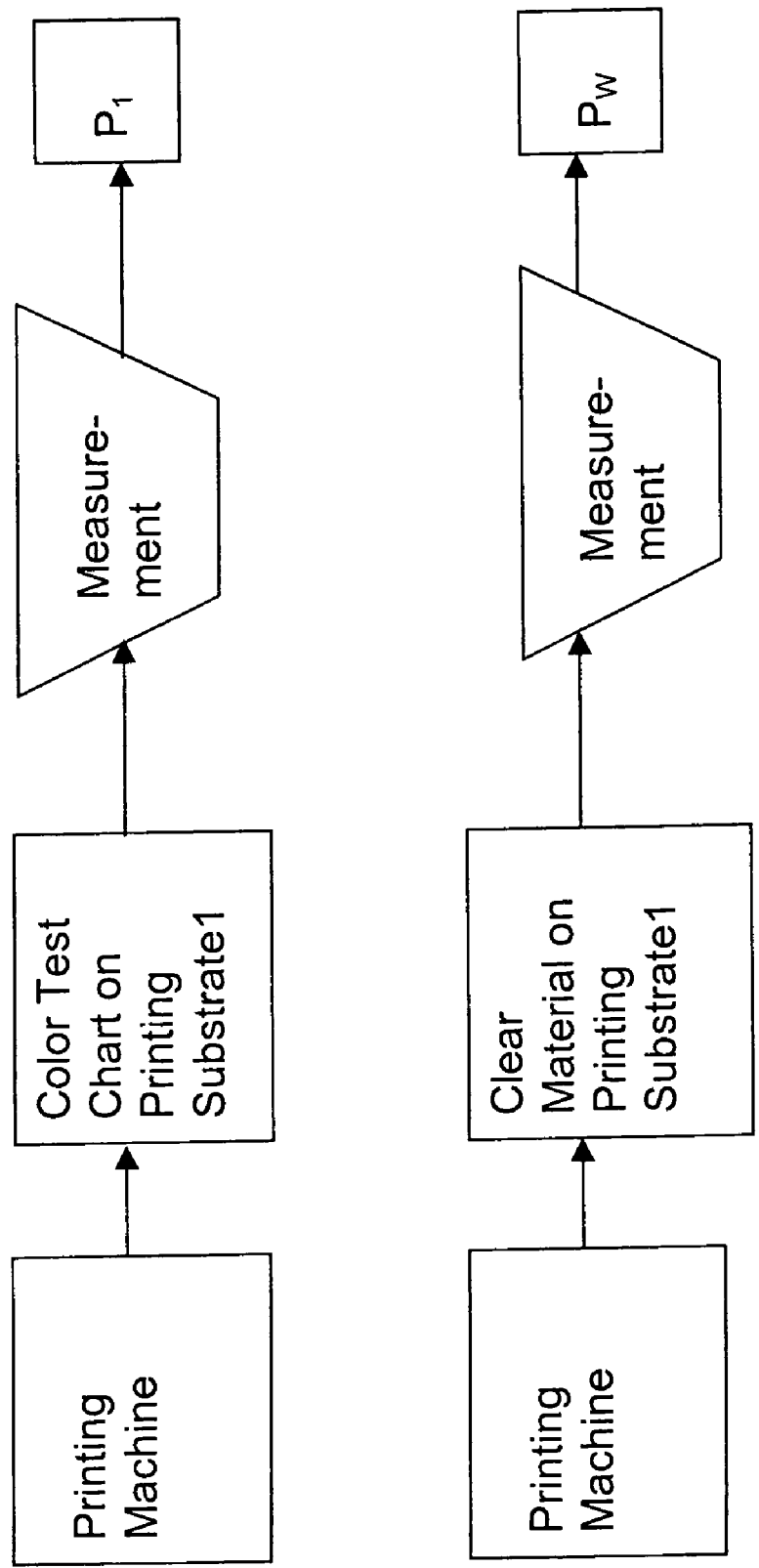
Figure 4:
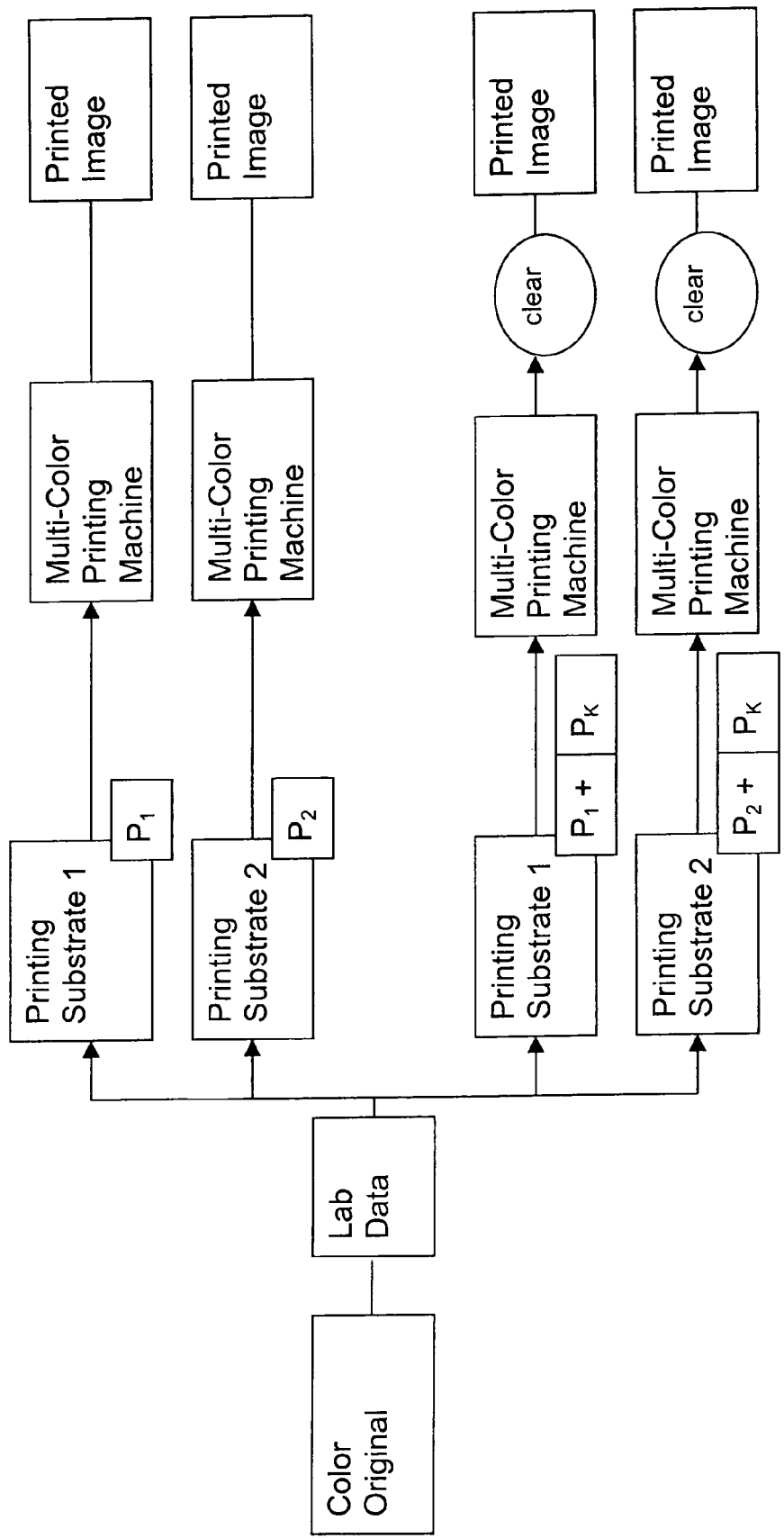

FIG. 1 the basic process of generating a color print corresponding to a color original;

FIG. 2 a first embodiment of an inventive determination of a clear printing color profile;

FIG. 3 a second embodiment of an inventive determination of a clear printing color profile; and, FIG. 4 the process in accordance with FIG. 1, a data flow chard with color management modules for print adjustment by an inventive inclusion of a clear printing color profile yielded in accordance with FIG. 2 or FIG. 3.

FIG. 1 shows, in a schematic block diagram, the basic per se known process of generating a color print corresponding to a color original.

To start with, a printed original is measured and its color measuring data are converted into the Lab color system in order to have these data initially available independent of the device and in order to be able to then use these data for the production of an adequate printed image in a printing machine, taking into account the device-specific printing color profile. The printing color profile that is to be used and that must be generated first, in particular, also depends on the printing material version that is used. In order to avoid confusion, only two different printing material versions 1 and 2 are assumed in FIG. 1. In fact, of course, many more could be used.

With the use of the appropriate printing material version, the printing machine can produce a printed image; referring to FIG. 1, in addition, it was assumed in the case of each of the printing material versions 1 and 2 that the printed image could be selectively produced with or without additional clear material ("clear") as the applied print or as the coating.

Of course, not only the specific printing material version must be taken into account when the required printing ink profile is generated, but many different printing ink combinations on each of the printing material versions—each having to be measured with the use of corresponding color patterns and ultimately resulting in a comprehensive color conversion table—must be taken into account.

The invention also provides that a potential color change due to the clear material be adequately taken into account. To achieve this, it is suggested in accordance with the invention that a separate clear printing color profile for the clear material be determined, that this profile be linked with the printing ink color profile and be used in an per se known algorithm for color management. This means a "paper-white" adjustment for example by use of absolute calorimetric rendering intend within the ICC-transformation.

In order to determine the clear printing color profile, two possible versions are suggested as preferable by the invention.

FIG. 2 is a schematic block diagram showing the process of determining a clear printing color profile in a differential manner.

To start with, for example, a color pattern is printed on the printing material version 1 and measured in a manner known per se in order to yield a color profile "$P_1$".

Then, the printing machine is used to print the same printing material version 1 with the same color pattern and, additionally, with the desired clear material, and, likewise in a manner known per se, this pattern is measured to generate a color profile "$P_1 + P_K$". By subtraction, or by determining the difference, these two printing color profiles provide a clear printing color profile "$P_K$".

FIG. 3 shows a second option, whereby, to start with—as above in FIG. 2—the printing color profile "$P_1$" is determined, and then the same printing material version 1 is printed (or coated) only with the desired clear material, and thus the clear printing "paper-white" colorimetric data "$P_w$" is directly determined.

Now, using the thusly yielded printing color profiles, it is possible, as shown by FIG. 4, to generate a printed image corresponding to a printed original in accordance with the invention with the use of the color profiles "$P_1$"+"$P_K$" or "$P_1$"+"$P_w$" as yielded in accordance with FIG. 2 or with FIG. 3, while using the clear material.

Preferably with the procedure of FIG. 2, fewer color profile measuring points can be interpolated for "$P_1+P_K$", and more values can be interpolated than for "$P_1$" itself.

Actually, also the color profiles "$P_K$" would have to be more accurately indexed with the printing material version, i.e., they should actually be identified as "$P_{1K}$" in FIG. 2 and FIG. 3. In that case, preferably (also) clearly fewer, i.e., 1 to m, clear printing color profiles "$P_{mK}$" for m classes of printing material versions 1 through n could be measured (where m<n) than corresponding n "$P_n$" printing ink color profiles for all n printing material versions 1 through n.

The invention claimed is:

1. Method of generating a printing color profile for printing images with a digital color printing machine, comprising the steps of:
   calibrating a first color profile for characterizing a multi colorant print on a specific substrate;
   calibrating a second color profile for characterizing the same multi colorant print with an transparent toner layer on top of the print by use of clear toner test prints;
   processing all image data on a pixel by pixel basis using a color management module with the first and second color profiles sequentially performed; and
   wherein the clear printing color profile is determined in that the first color profile color profile is generated for a color print produced on a specific test print material and that a second color profile is generated for a color print image produced with a clear layer on top of the print, and that the clear printing color profile is determined based on the difference between the first and second color profiles.

2. Method as in claim 1, wherein the transparent layer coverage varies between 5 and 100% and the clear printing color profile is determined for selected area coverage levels.

3. Method as in claim 1, wherein the clear printing color profiles are pre-calculated for specific substrate classes and clear material types and a number of selected coverage levels.

4. Method as in claim 1, wherein the generation of the clear printing color profile is based on at least one of a coarser color space grid and a respective number of test patches other than the one used for the generation of the printing ink color profile.

5. Method as in claim 1, wherein the color management is accomplished by use of precalculated "device-link-ICC-profiles", each calculated by combining the print job dependant substrate profiles with the differential clear profiles of the selected clear material and coverage level.

6. Method as in claim 1, wherein the transparent material is a clear toner.

7. Method as in claim 1, wherein the multi-color printing machine comprises an extra printing unit for the clear toner.

8. Method as in claim 1, wherein a clear varnish is provided as the clear material.

9. Method as in claim 6, wherein a separate gloss-producing arrangement is provided for the application of the clear material.

10. Method as in claim 9, wherein the effect of the separate glosser device on a printed image is included in the generation of the clear printing color profile.

11. Method as in claim 7, wherein a separate gloss-producing arrangement is provided for the application of the clear material.

\* \* \* \* \*